United States Patent [19]

Gray

[11] 4,293,113

[45] Oct. 6, 1981

[54] UNIVERSAL FISHING ROD SUPPORT

[76] Inventor: David L. Gray, 720 Courtland, Richmond, Calif. 94805

[21] Appl. No.: 91,302

[22] Filed: Nov. 5, 1979

[51] Int. Cl.³ ............................................. F16M 13/00
[52] U.S. Cl. .................................... 248/518; 248/121; 248/530
[58] Field of Search ............... 248/518, 470, 121, 122, 248/156, 530, 208, 216.1, 480; 108/46

[56] References Cited

U.S. PATENT DOCUMENTS

| | | |
|---|---|---|
| 1,552,535 | 9/1925 | Beerstecher . |
| 1,831,190 | 11/1931 | Parker . |
| 1,876,478 | 9/1932 | Van Duzer ........................ 248/518 |
| 2,380,860 | 7/1945 | Metzger . |
| 2,548,351 | 4/1951 | Coombs ............................ 248/518 |
| 2,566,496 | 9/1951 | Montana ........................ 248/518 X |
| 2,576,624 | 11/1951 | Miller . |
| 3,266,443 | 8/1966 | Lee ...................................... 108/46 |
| 3,319,911 | 5/1967 | Fuller . |
| 3,488,026 | 1/1970 | Wallace et al. ..................... 248/480 |
| 3,612,454 | 10/1971 | Linn ............................. 248/518 X |

*Primary Examiner*—James T. McCall
*Attorney, Agent, or Firm*—Townsend and Townsend

[57] ABSTRACT

A fishing rod holder comprises a tubular body, an upper bracket assembly, and a lower bracket assembly. The upper bracket assembly comprises first and second upper bracket arms carrying hooking elements of a sufficiently small thickness to readily pass between the window of a vehicle door and the outer portions of the vehicle door. The lower bracket assembly comprises first and second lower bracket legs carrying feet for confronting the outer surface of the vehicle door. The hooking elements are capable of being wrapped at least partially around a horizontal railing portion, and the lower bracket members together define a U-shaped configuration capable of straddling a vertical railing portion. The holder includes a sand spike flexibly connected to a point proximate the normally lower end of the tubular body. When the sand spike is driven into the ground, the upper bracket arms extend generally downwardly to the ground and thus define with the lower end of the body a three-point support for the fishing rod.

12 Claims, 4 Drawing Figures

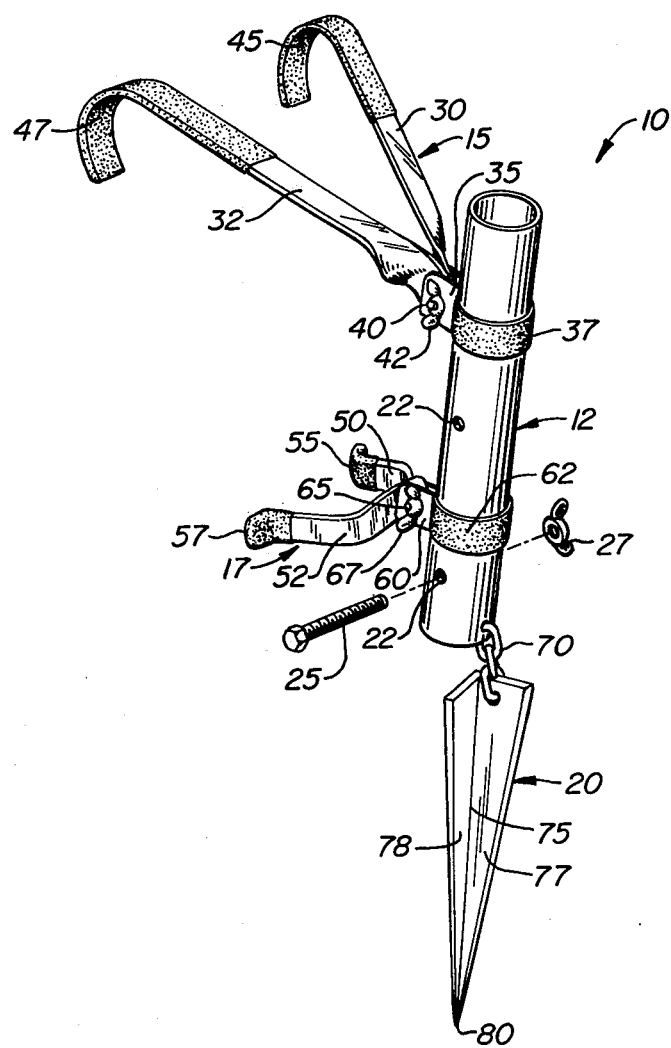
FIG._1.

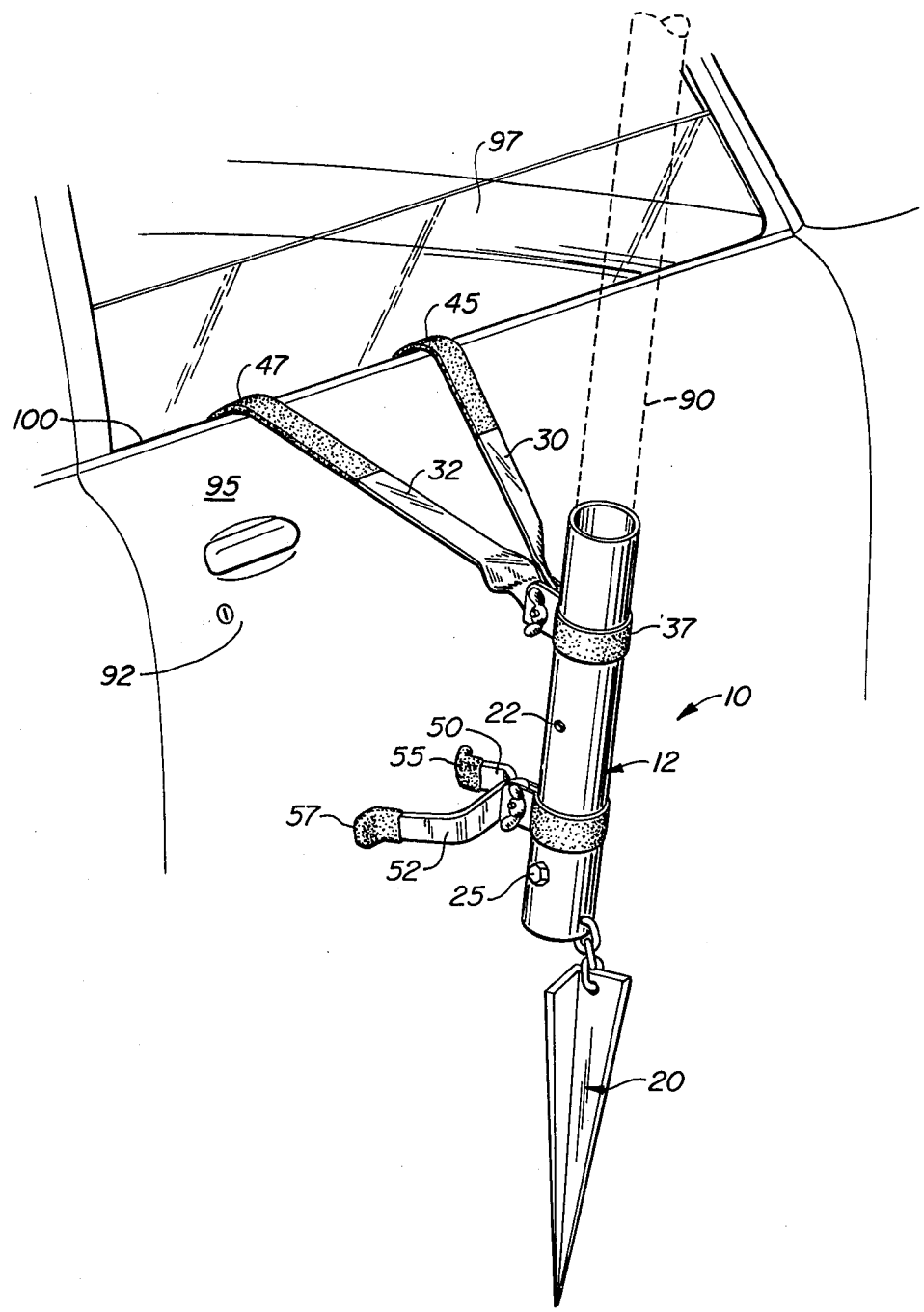
FIG._2.

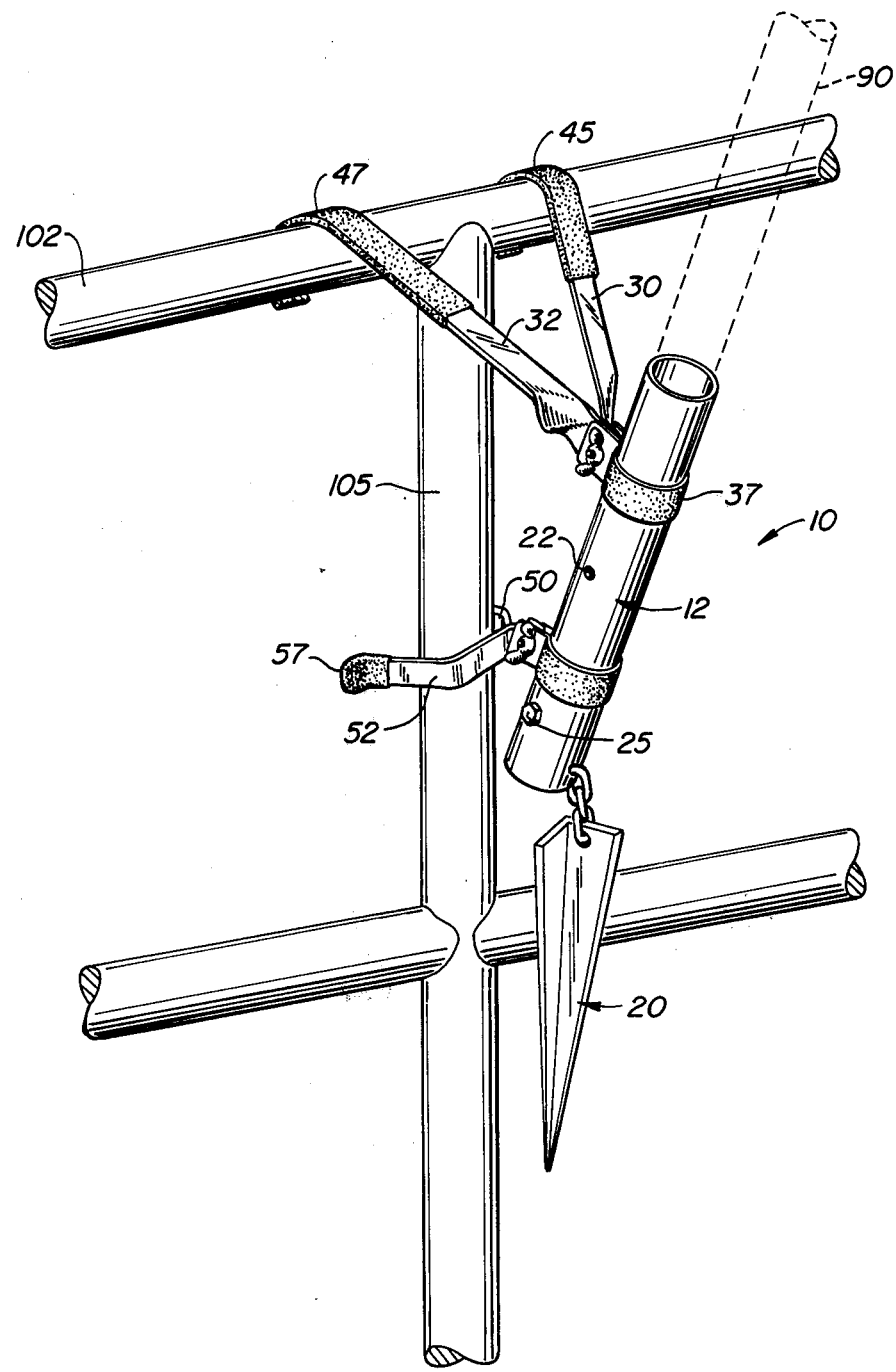
FIG._3.

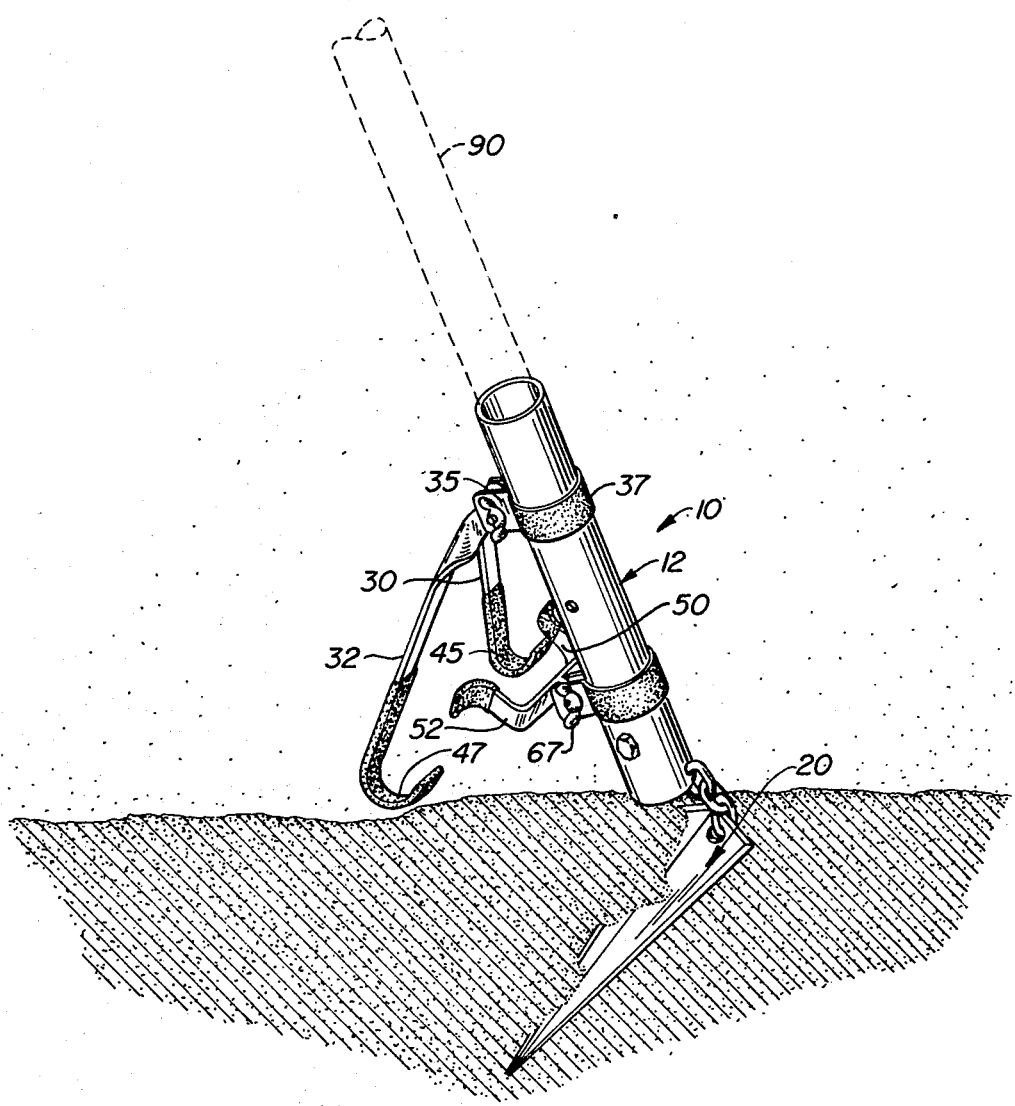
FIG._4.

UNIVERSAL FISHING ROD SUPPORT

FIELD OF THE INVENTION

The present invention relates generally to fishing rod supports, and more specifically to a portable fishing rod support that is capable of supporting a fishing rod in a wide variety of situations.

BACKGROUND OF THE INVENTION

With respect to many types of fishing, it is no understatement to say that a sizeable fraction of the time is spent waiting for something to happen. During most of this time, the fishing rod is held in a generally upright inclined position as the angler waits for the taletale tug signifying that a fish has taken the bait. In order to ease the fatigue that would set in from holding the rod during these long periods of time, various fishing rod support arrangements have been devised.

The nature of known fishing rod supports varies, depending on the location from which the fisherman is fishing. For example, the angler may be fishing from a pier, from a boat, from the shoreline, or from an automobile. The more informal support mechanisms provide an upstanding structure (e.g. a fishing tackle box) over which the rod is inclined, and a weighted element (e.g. a handy rock) to hold the butt end of the rod handle on the ground. Less ad hoc methods of supporting a fishing rod may be found in the patent literature.

For example, U.S. Pat. No. 3,319,911 discloses a fishing rod holder that may be mounted to a boat or a pier. This is accomplished by the provision of a suitable mounting bracket which is more or less permanently attached to the boat or pier, and which receives and holds suitable rod supporting structure. U.S. Pat. No. 2,576,624 shows a fishing rod holder that may be fastened to the user's belt or alternately to an upright anchor post. It is clear that these prior art devices have a common characteristic, namely the need for a customized fixed mating supporting structure on the boat or pier. U.S. Pat. No. 1,831,190 discloses a portable fishing rod holder that clamps over the side of a boat. However, this holder is unsuitable for use in other situations, and may even be of limited usefulness on many kinds of boats.

It is also known in the prior art to provide a sand spike to which is rigidly mounted a tubular rod holder. The spike is pushed into the ground to provide a support for the rod near ground level, thus allowing the fisherman fishing from the shoreline of a body of water to enjoy the benefits of a fishing rod support.

However, the prior art fishing rod holders have tended to be designed for one or at most two uses, and have not provided the user with true flexibility. Therefore, the angler who has wished to have fishing rod holders for a wide variety of situations has generally been forced to carry several special purpose fishing rod holders in his tackle box. This is both costly and inconvenient.

SUMMARY OF THE INVENTION

The present invention provides a completely self-contained fishing rod holder that is suitable for supporting a fishing rod from a vehicle door, from a railing, or from a position at ground level, depending on the desire of the user.

Broadly, the fishing rod holder comprises a tubular body having an inner diameter sized to accomodate the handle of a fishing rod to be supported, an upper bracket assembly, and a lower bracket assembly. The upper bracket assembly comprises first and second upper bracket arms attached at respective first ends thereof to a normally upper portion of the body, and carrying hooking elements at their respective second ends. These hooking elements are of a sufficiently small thickness to readily pass between the window of a vehicle door and the outer portions of the vehicle door to provide support therefrom when the upper bracket arms are put in tension. The lower bracket assembly comprises first and second lower bracket legs attached at respective first ends thereof to a normally lower portion of the body, carrying feet at their respective second ends for confronting the outer surface of the vehicle door. Thus, when a fishing rod handle is placed in the tubular handle receiving member, the upper bracket arms are placed in tension while the lower bracket members are placed generally in compression, thereby providing a surprisingly stable support from the vehicle door.

According to a further aspect of the present invention, the hooking members are capable of being wrapped at least partially around a horizontal railing portion, and the lower bracket members together define a U-shaped configuration capable of accommodating therebetween a vertical railing portion. Therefore, surprisingly, the configuration that is so well adapted for use on a vehicle door, serendipitously provides a stable three point support from a railing such as may be found on a fishing boat or a pier.

According to yet a further aspect of the present invention, the holder includes ground attachment means such as a sand spike flexibly connected to a point proximate the normally lower end of the tubular body. The upper bracket arms are constructed to be capable of withstanding compression so that when the sand spike is driven into the ground to hold the lower end of the body at a fixed position, the upper bracket arms extend generally downwardly to the ground and thus define with the lower end of the body a three-point support for the fishing rod.

With respect to the connection between the body and either of the upper and lower bracket assemblies, the range of possible orientations of the fishing rod is increased by providing an adjustable locking mechanism so that the angle between the bracket members and the body may be varied. This may be conveniently effectuated by using a bolt and wing nut connection.

For a further understanding of the nature and advantages of the present invention, reference should be had to the remaining portions of this specification and to the attached drawings.

BRIEF DESCRIPTION OF THE DRAWINGS

FIG. 1 is a perspective view of a fishing rod support according to the present invention;

FIG. 2 is a perspective view of the present invention in use on a vehicle door;

FIG. 3 is a perspective view of the present invention in use on a railing; and

FIG. 4 is a perspective view of the present invention in use at ground level.

DETAILED DESCRIPTION OF THE INVENTION

FIG. 1 is a perspective view showing a fishing rod holder 10 constructed according to the present invention. Broadly, holder 10 includes a hollow tubular body 12, an upper bracket assembly 15, a lower bracket assembly 17, and a sand spike 20, which subassemblies will be described in detail below.

Body 12 is preferably a cylindrical tube having an inner diameter sized to receive the handle of a fishing rod and provide substantial restriction of transverse motion thereof. Body 12 is diametrically pierced by a plurality of apertures 22 sized to accommodate a bolt 25 of sufficient length to extend all the way through and be held fast by a cooperating wing nut 27. Body 12 has an overall length sufficient to provide suitable support for the longest fishing rod handles, while the provision of apertures 22 at intermediate distances allows shorter effective lengths to be achieved by insertion of bolt 25 through a particular aperture. An overall length of approximately 12 inches has been found suitable. Body 12 may be fabricated from any relatively rigid material. Polyvinyl chloride (PVC) tubing has been found desirable since it combines strength and rigidity while being soft enough to avoid damage to the fishing rod.

Upper bracket assembly 15 comprises paired upper bracket arms 30 and 32 attached at first ends thereof to body 12 and carrying respective hooking portions 45 and 47 at their second ends. A first band 37 extends around body 12 and carries a first radially extending projection 35. Arms 30 and 32 are attached to projection 35 by a bolt 40 and wing nut 42.

Lower bracket assembly 17 comprises paired lower bracket legs 50 and 52 attached at first ends thereof to body 12 and carrying respective feet 55 and 57 at second ends thereof. A second circumferential band 62 carries a second radially extending projection 60. Legs 50 and 52 are attached to projection 60 by a bolt 65 and wing nut 67.

As will be described below, depending on the particular use to which rod support 10 is put, upper bracket arms 30 and 32 may be required to withstand tension as well as compression, and lower bracket legs 50 and 52 are required to withstand compression and shear. A suitable material for the bracket arms and legs is a flexible metal such as soft iron with the hooking portions and footing portions being coated with a resilient plastic material such as the type used for coating tool handles and the like.

Sand spike 20 is attached to a normally lower end of tube 12 by any suitable flexible interconnecting means such as a short length of chain 70. Water-resistant twine may also be used. The interconnection is preferably removable, since as will be seen below, sand spike 20 is not required in all applications. Sand spike 20 is of any suitable design that may be easily driven into sand or earth and remain fast. In the preferred embodiment, sand spike 20 comprises an elongate piece of sheet metal having a central longitudinal bend 75, the metal on either side of the bend defining paired narrow wedges 77 and 78 to provide a point 80 at a lower end thereof. Sand spike 20 is preferably constructed of a somewhat harder material than bracket arms 30 and 32 and bracket legs 50 and 52 in order that it resist bending. A somewhat harder steel is suitable. An overall length of approximately 10 inches has been found suitable.

Having described the structure of the present invention, the operation and functioning may now be understood. Rod holder 10 is suitable for use in a variety of situations as illustrated in FIGS. 2, 3, and 4, now to be described.

FIG. 2 is a perspective view showing rod holder 10 in use supporting a fishing rod, designated in phantom as 90, from a standard vehicle door 92. Vehicle door 92 has an outer portion 95 and a retractable window 97, with a gap 100 therebetween. Hooking portions 45 and 47 are sufficiently thin to fit within gap 100 and extend downwardly thereinto. Lower bracket feet 55 and 57 confront the outer surface of outer door portion 95. The weight of rod 90 acts to put bracket arms 30 and 32 in tension and lower bracket legs 50 and 52 into compression and shear, thus defining a stable support. The angle of inclination of rod 90 may be varied by loosening wing nut 42 and/or 67 and adjusting the appropriate bracket members prior to retightening the wing nut. Sand spike 20 is shown attached, but has no function in this application, and may be removed when support 10 is used for supporting rod 90 from a vehicle door. The plastic coating protects the door finish and also prevents slipping.

FIG. 3 is a perspective view showing rod holder 10 in use supporting rod 90 from a railing having a horizontal railing portion 102 and a vertical railing portion 105. Such a railing is common on fishing boats and piers. In this application, hooking portions 45 and 47 are wrapped partially around horizontal railing portion 102 while lower bracket legs 50 and 52 straddle vertical railing portion 105. If desired, bracket legs 50 and 52 may be further bent to wrap at least partially around vertical railing portion 105. Again, sand spike 20 serves no function in this application, and may be removed if desired.

FIG. 4 is a perspective view showing rod holder 10 supporting rod 90 from a point at ground level. In this application, sand spike 20 is driven into the ground to hold the lower end of body 12 firmly at a point on the ground. In this application, bracket arms 30 and 32 are put in compression by the weight of the rod and function as legs extending downwardly from radial projection 35, the outer portions of hooking elements 45 and 47 providing respective anchor points on the ground. Thus, a three-point support is provided with chain 70 being put in tension. Lower bracket legs 50 and 52 typically serve no function in this application, and may be conveniently moved out of the way by loosening wing nut 67.

In summary, it can be seen that the fishing rod support of the present invention, while self-contained and of simple construction provides stable support for a fishing rod in a wide variety of situations. While the above provides a full and complete disclosure of the preferred embodiments of the invention, various modifications, alternate constructions and equivalents may be employed without departing from the true spirit and scope of the invention. For example, upper bracket assembly 15 could comprise a single T-shaped bracket having the vertical portion of the T extending away from body 12 with the horizontal (cross) portion of the T defining the hooking portion for insertion into door gap 100, and providing the anchor points on the ground when used with the sand spike. Therefore, the above description and illustration should not be construed as limiting the scope of the invention, which is defined by the appended claims.

I claim:

1. A fishing rod support comprising:
means for receiving the handle of a fishing rod and restricting motion of said handle transverse to the axis of said rod;
upper bracket means attached at a first end thereof to a normally upper portion of said receiving means, said upper bracket means being capable of withstanding tension;
lower bracket means attached at a first end thereof to a normally lower portion of said receiving means, said lower bracket means being capable of withstanding compression, said lower bracket means being configured to straddle a vertical portion of a railing;
hooking means carried by said upper bracket means at a second end thereof, said hooking means being configured to pass over the outer portion of a vehicle door and downwardly into the space between the vehicle door and the vehicle window, said hooking means being further configured to fit over a horizontal portion of said railing to provide spaced support points; and
footing means carried by said lower bracket means at a second end thereof for confronting the outer surface of said vehicle door;
said fishing rod support being thus adapted to support said fishing rod from said vehicle door with said hooking means and said footing means together providing at least three points of contact with said vehicle door to provide a spaced stable attachment thereto, downward forces on said rod putting said upper bracket means in tension and said lower bracket means generally in compression to enhance the stability of said support;
said fishing rod support being thus further adapted to support said fishing rod from said railing.

2. The invention of claim 1 wherein said upper bracket means comprises first and second elongate arms extending away from said receiving means and away from each other, and wherein said hooking means comprises first and second hooking elements connected to said first and second arms, respectively.

3. The invention of claim 1 wherein said lower bracket means comprises first and second legs, and wherein said footing means comprises first and second feet affixed to said first and second legs, respectively.

4. The invention of claim 1 or 2 or 3 including adjustably locking mounting means for varying the positioning of at least one of said upper and lower bracket means to provide an adjustment of the inclination of said receiving means with respect to said vehicle door.

5. The invention of claim 1 or 2 or 3 wherein said upper bracket means is capable of withstanding compression, and further comprising:
ground attachment means for maintaining a normally lower end of said receiving means at a fixed point on the ground; and
adjustably locking mounting means for permitting the angle between said upper bracket means and said receiving means to be set and locked in a desired position;
said hooking means having portions for providing spaced points of contact with the ground when said ground attachment means maintains said lower end of said receiving means proximate ground level, and said upper bracket means being put in compression and maintaining the upper end of said receiving means at a position above the ground to provide an inclined support for said rod.

6. The invention of claim 5 wherein said ground attachment means comprises a sand spike and means flexibly connecting said sand spike to said lower end of said receiving means.

7. The invention of claim 1 wherein said hooking means is fabricated from a somewhat flexible material to permit said hooking means to be wrapped at least partially around said horizontal railing portion.

8. A fishing rod holder for supporting a fishing rod alternately from a vehicle door having a window, from a railing having vertical and horizontal portions, or at a position at ground level comprising:
a tubular body member having an inner diameter sized to accommodate the handle of a fishing rod to be supported;
first and second upper bracket arms, each having first and second ends;
first means for adjustably attaching said first ends of said upper bracket arms to said tubular body member at a first region of said tubular member;
first and second hooking elements carried by said first and second upper bracket members, respectively, at said second ends thereof, said hooking members having portions sufficiently thin to fit between said vehicle door window and the outer portions of said vehicle door, said hooking members also being adapted to fit over said horizontal railing portion;
first and second lower bracket legs, each having first and second ends;
second means for adjustably attaching said first ends of said lower bracket members to said tubular body member at a second region normally below said first region of said tubular body member;
said lower bracket legs extending away from said second attaching means in a generally U-shaped configuration sized to accommodate therebetween said vertical railing portion and prevent horizontal movement of said second region of said tubular body member relative thereto;
first and second feet at carried by said first and second lower bracket members, respectively, said second ends thereof, being adapted to confront the outer surface of said vehicle door;
a sand spike; and
flexible interconnection means coupling a normally upper end of said sand spike to a point proximate a normally lower end of said tubular member;
said upper bracket arms being capable of withstanding compression so as to support said first region of said tubular member above the ground when said sand spike is forced into the ground, thereby maintaining said normally lower end of said tubular member in position, said hooking members providing spaced points of contact with the ground to provide a stable support of said fishing rod from a point at ground level.

9. A fishing rod support comprising:
means for receiving the handle of a fishing rod and restricting motion of said handle transverse to the axis of said rod;
upper bracket means attached at a first end thereof to a normally upper portion of said receiving means, said upper bracket means being capable of withstanding tension and compression;
lower bracket means attached at a first end thereof to a normally lower portion of said receiving means, said lower bracket means being capable of withstanding compression;

hooking means carried by said upper bracket means at a second end thereof, said hooking means being configured to pass over the outer portion of a vehicle door and downwardly into the space between the vehicle door and the vehicle window;

footing means carried by said lower bracket means at a second end thereof;

said hooking means and said footing means together providing at least three points of contact with said vehicle door to provide a spaced stable attachment thereto, downward forces on said rod putting said upper bracket means in tension and said lower bracket means generally in compression to enhance the stability of said support;

ground attachment means for maintaining a normally lower end of said receiving means at a fixed point on the ground; and adjustably locking mounting means for permitting the angle between said upper bracket means and said receiving means to be set and locked in a desired position;

said hooking means having portions for providing spaced points of contact with the ground when said ground attachment means maintains said lower end of said receiving means proximate ground level, and said upper bracket means being put in compression and maintaining the upper end of said receiving means at a position above the ground to provide an inclined support for said rod.

10. The invention of claim 9 wherein said upper bracket means comprises first and second elongate arms extending away from said receiving means and away from each other, and wherein said hooking means comprises first and second hooking elements connected to said first and second arms, respectively.

11. The invention of claim 9 wherein said lower bracket means comprises first and second legs, and wherein said footing means comprises first and second feet affixed to said first and second legs, respectively.

12. A fishing rod holder for supporting a fishing rod alternately from a vehicle door having a window, or from a railing having vertical and horizontal portions, comprising:

a tubular body member having an inner diameter sized to accommodate the handle of a fishing rod to be supported;

first and second upper bracket arms, each having first and second ends;

first means for adjustably attaching said first ends of said upper bracket arms to said tubular body member at a first region of said tubular member;

first and second hooking elements carried by said first and second upper bracket members, respectively, at said second ends thereof, said hooking members having portions sufficiently thin to fit between said vehicle door window and the outer portions of said vehicle door, said hooking members also being adapted to fit over said horizontal railing portion and provide support therefrom;

first and second lower bracket legs, each having first and second ends;

second means for adjustably attaching said first ends of said lower bracket members to said tubular body member at a second region normally below said first region of said tubular body member;

said lower bracket legs extending away from said second attaching means in a generally U-shaped configuration sized to accommodate therebetween said vertical railing portion and prevent horizontal movement of said second region of said tubular body member relative thereto; and first and second feet at carried by said first and second lower bracket members, respectively, said second ends thereof, being adapted to confront the outer surface of said vehicle door.

* * * * *